United States Patent
Joffe et al.

(10) Patent No.: US 10,135,531 B1
(45) Date of Patent: Nov. 20, 2018

(54) SYSTEMS AND METHODS FOR CANCELLATION OF UNDESIRED REFLECTIONS IN TESTING OF OPTICAL FIBERS

(71) Applicant: ADTRAN, Inc., Huntsville, AL (US)

(72) Inventors: Daniel M. Joffe, Owens Crossroads, AL (US); John G. Brooks, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/655,441

(22) Filed: Jul. 20, 2017

(51) Int. Cl.
- *H04B 10/50* (2013.01)
- *H04B 10/2507* (2013.01)
- *H04B 10/071* (2013.01)
- *H04B 10/60* (2013.01)

(52) U.S. Cl.
CPC ....... *H04B 10/2507* (2013.01); *H04B 10/071* (2013.01); *H04B 10/50* (2013.01); *H04B 10/60* (2013.01)

(58) Field of Classification Search
CPC .. H04B 10/2507; H04B 10/071; H04B 10/50; H04B 10/60; H04B 10/505; G02B 6/14; G02B 6/262; G02B 6/3604; A61F 9/008
See application file for complete search history.

(56) References Cited

U.S. PATENT DOCUMENTS

| | | | |
|---|---|---|---|
| 8,526,824 B1 | 9/2013 | Turner et al. | |
| 8,606,117 B1 | 12/2013 | Turner et al. | |
| 9,116,076 B2 | 8/2015 | Joffe | |
| 9,143,228 B2 | 9/2015 | Sandstrom | |
| 9,191,102 B2 | 11/2015 | Joffe et al. | |
| 9,614,616 B2 | 4/2017 | Joffe et al. | |
| 2004/0044489 A1* | 3/2004 | Jones | H04L 43/50 702/79 |
| 2013/0202287 A1* | 8/2013 | Joffe | G01M 11/3118 398/13 |

* cited by examiner

*Primary Examiner* — Ted Wang
(74) *Attorney, Agent, or Firm* — Maynard Cooper and Gale, P.C.; Jon E. Holland

(57) ABSTRACT

An optical transmission system transmits an optical signal over an optical path. Reflections of the optical signal are received at an optical detector which generates an analog reflection signal. The analog reflection signal includes both a desired portion and an undesired portion. Correlators of an OTDR system generate correlation values based on the analog reflection signal. A subset of the correlation values are associated with locations of the optical path that cause the reflections that result in the undesired portion of the reflected signal. A filter uses these correlation values to generate a cancellation signal that is subtracted from the analog reflection signal, reducing the undesired portion of the signal that must be processed.

23 Claims, 6 Drawing Sheets

SYSTEMS AND METHODS FOR CANCELLATION OF UNDESIRED REFLECTIONS IN TESTING OF OPTICAL FIBERS

RELATED ART

In fiber-optic communication systems, optical signals are used to carry data sometimes across great distances. It is well known that optical signals typically provide significantly higher data rates than those enabled by electrical signals. However, anomalies along an optical fiber, such as degraded splices, can adversely affect the performance of optical communication. Thus, techniques have been developed to locate fiber anomalies so that the anomalies can be repaired in order to improve communication performance.

In particular, optical time domain reflectometers (OTDRs) for detecting optical fiber anomalies have been developed and successfully used. One type of OTDR transmits a pulse along an optical path. A portion of the light of the pulse is returned toward the transmitter from each point along the optical path. As will be well known to those skilled in the art, such returns are produced by scattering of the light (Rayleigh backscatter) all along the length of the optical path and in some cases by localized reflections (Fresnel reflections) at particular points along the path. Herein, both these sorts of optical signal returns are collectively referred to as reflections. At an anomaly, such as a degraded splice, more attenuation may occur as light passes through the splice, and in some cases more light may be reflected at this point than at other points that are free of anomalies. The OTDR measures the light returned from points along the length of the optical path and detects anomalies based on the reflected light.

Further, the OTDR can also estimate the location of the detected anomaly based on reflection delay. In this regard, each point along the optical path corresponds to a particular delay measured from the time of transmission by the OTDR. That is, the further the location is from the OTDR, the longer it will take for a transmitted pulse to reach the location, reflect, and return to the OTDR. Thus, the OTDR measures the amount of delay between transmission of the pulse and reception of a reflection that may indicate the presence of an anomaly. The delay corresponds to the distance of the anomaly from the OTDR, and the OTDR estimates the distance of the detected anomaly from the OTDR based on such delay.

In another type of OTDR, often referred to as a correlation OTDR, a pseudo-noise (PN) sequence is transmitted along the optical path instead of a pulse. The PN sequence that reflects from the optical path is correlated with a delayed version of the transmitted PN sequence. In this regard, the reflected PN sequence and delayed PN sequence are input into a bank of correlators for which each correlator corresponds to a discrete delay and, hence, location on the optical path. The delayed PN sequence is stepped through a delay line, and for each step, each correlator correlates (e.g., multiplies and accumulates) a respective value of the delayed PN sequence with the value of the reflected PN sequence currently received from the optical path, thereby outputting a correlation value indicating to what degree the two sequences match.

The delay is controlled such that a given correlator receives a value of the delayed PN sequence when a reflection of that value would be received from the location corresponding to the correlator. Accordingly, PN sequence values received from locations with delays that do not correspond to a given correlator vary relative to the values from the delayed PN sequence such that the correlation values are substantially canceled by the accumulation process. However, reflected PN sequence values received from the location with a delay which does correspond to that correlator respectively match the values from the delayed PN sequence such that the correlation values accumulate to a significant number over time.

Therefore, each correlator provides an output indicative of the light reflected from a given point on the optical path and substantially independent of light reflected from other locations along the path. If a correlator associated with an optical fiber within the optical path provides an output value which is significantly different from the value that would be expected for a location of a fiber with no anomaly at that location, then it can be determined that an anomaly likely exists at the fiber location corresponding to the correlator.

OTDR systems receive reflected optical signals at a photo detector such as an avalanche photo diode (APD), and the reflected optical signal is output as an analog reflection signal that is representative of the reflected optical signal. In order to be used by an OTDR system such as a correlation OTDR, this analog reflection signal must be digitized such as by an analog-to-digital converter. The analog-to-digital converter may have a resolution of digital bits that may be used to represent the variations in the analog reflection signal.

In general, the portion of the optical signal reflected by each point of the fiber is small, and the reflections typically have relatively low power making the OTDR measurements particularly vulnerable to noise. Further, the fiber attenuates the power of the reflections such that it can be particularly difficult to obtain accurate measures for points far from the transmitter. Gain is usually applied to the analog reflection signal that is to be processed by the OTDR, but the amount of gain that can be applied is limited by the dynamic range of the analog-to-digital converter. Techniques for improving the accuracy of the OTDR measurements are generally desirable.

BRIEF DESCRIPTION OF THE DRAWINGS

The disclosure can be better understood with reference to the following drawings.

The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
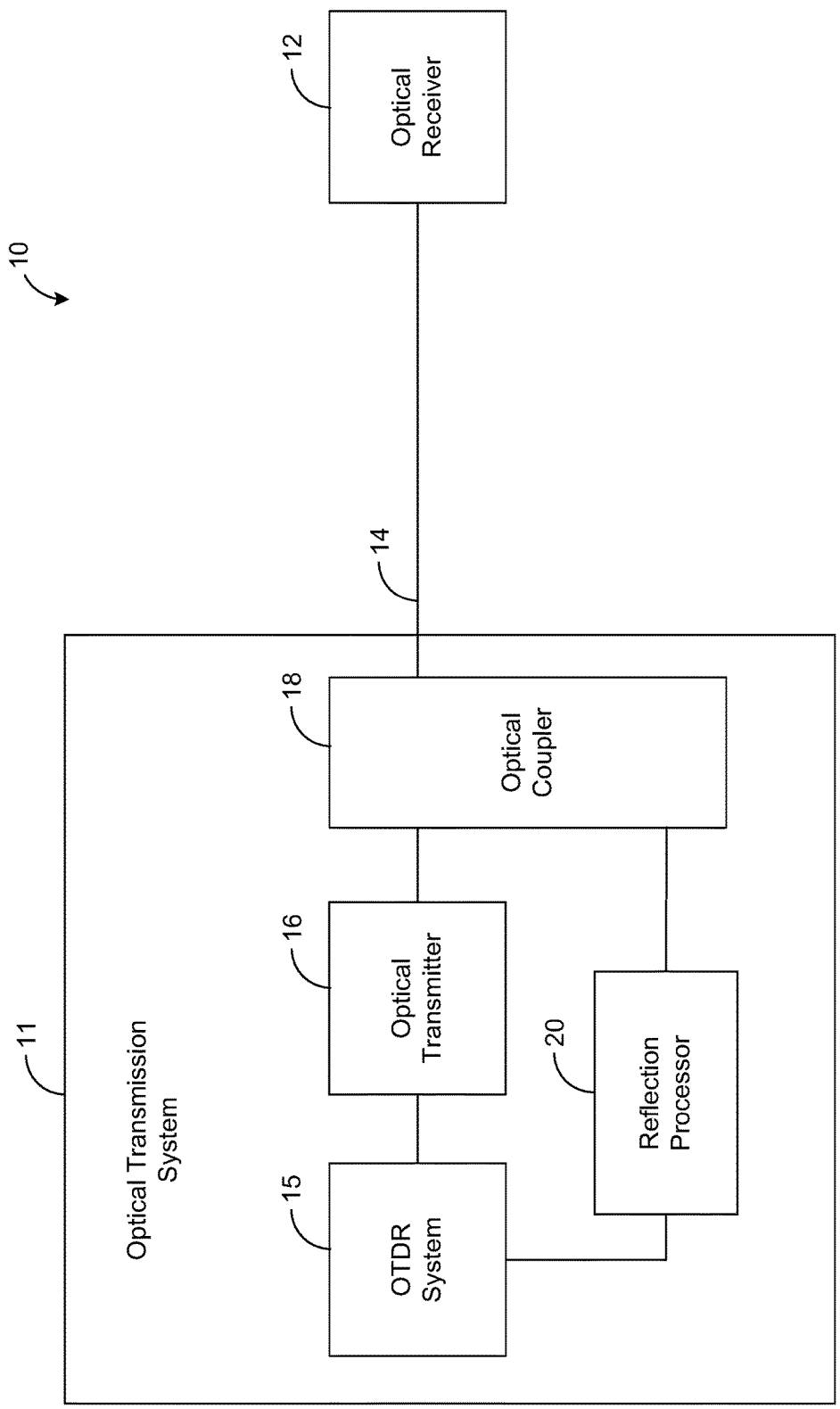
FIG. 1 is a block diagram illustrating an exemplary embodiment of a communication system in which an optical transmission system has an optical time domain reflectometer (OTDR) system for detecting anomalies of an optical fiber.

In an optical time domain reflectometer (OTDR) system, the largest reflections of the reflected optical signal may correspond to reflections from locations along the optical path other than the optical fiber, such as from the optical transmitter and the optical coupling. For example, the optical transmitter and the optical coupling are located closest to the APD and may reflect more of the transmitted optical signal compared to the optical fiber. However, it may not be desired for the OTDR system to analyze the reflected optical signal from the optical transmitter and optical coupling, as the purpose of the OTDR is to identify anomalies within the optical fiber. Thus, these reflections may be referred to as an undesired portion of the reflected optical signal.

When the reflected optical signal is converted into an analog reflection signal, it includes both the desired and undesired portions. Because the reflections from the undesired portion of the reflected optical signal (e.g., corresponding to the optical transmitter and optical coupling) are large relative to the reflections from the desired portion of the reflected optical signal (e.g., corresponding to the optical fiber), a significant portion of the dynamic range of the analog-to-digital converter must be dedicated to converting the undesired portion of the analog reflection signal into a digital signal. This may limit the dynamic range of the analog-to-digital converter that may be used for converting the desired portion of the analog reflection into a digital signal, resulting in a larger quantization error for that portion of the analog reflection signal. Accordingly, it would be desirable to minimize the undesired portion of the reflected optical signal from the analog reflection signal prior to providing that signal to the analog-to-digital converter.

The present disclosure generally pertains to systems and methods for cancellation of an undesired portion of a reflected optical signal in testing of optical fibers. In one exemplary embodiment, a correlation OTDR system receives a reflected optical signal including both an undesired portion of the reflected optical signal (e.g., reflections that have not passed through the optical fiber under test) and a desired portion of the reflected optical signal (e.g., reflections that have passed through the optical fiber under test). The reflected optical signal is output as an analog reflection signal that includes both the desired and undesired portions. Signal processing results in cancellation of the undesired portion of the analog reflection signal prior to the analog reflection signal being converted to a digital signal by an analog-to-digital converter.

In one exemplary embodiment, the signal processing includes one or more correlators that are associated with one or more locations of the optical path that cause the undesired portion of the reflected optical signal. A digital filter such as a finite impulse response (FIR) filter receives the correlation values associated with the one or more correlators as well as the digital data sequence used to generate the OTDR test signal. The digital filter provides a digital cancellation signal that is intended to minimize (e.g., reduce below a threshold) the correlation values of the one or more correlators associated with the undesired portion of the reflected optical signal. The digital cancellation signal is converted to an analog signal by a digital-to-analog converter, and this cancellation signal is subtracted from the analog reflection signal prior to the analog-to-digital conversion. In this manner, the undesired portion of the analog reflection signal may be reduced.

In one exemplary embodiment, a first gain may be applied to the analog reflection signal prior to the cancellation signal being subtracted from the analog reflection signal. A second gain may also be applied to the signal that results from the subtraction, prior to that signal being input to the analog-to-digital converter. The first gain is optimized to scale the analog reflection signal relative to the cancellation signal, such that the cancellation signal is matched to the undesired portion of the analog reflection signal. The second gain scales the subtracted signal (i.e., including primarily the desired portion of the analog reflection signal) to encompass as much of the dynamic range of the analog-to-digital converter as possible without saturating the analog-to-digital converter.

FIG. 1 depicts a communication system 10 having an optical transmission system 11 that transmits optical signals to an optical receiver 12 via an optical fiber 14. The optical transmission system 11 has a correlation OTDR system 15 coupled to an optical transmitter 16, and an optical coupler 18 coupling the optical transmitter 16 to the optical fiber 14. A reflection processor 20 receives reflections of the transmitted optical signal via optical coupler 18 and generates an analog reflection signal based on the reflected optical signal. The reflection processor 20 also receives a digital data sequence from OTDR system 15. The reflection processor 20 processes the analog reflection signal and outputs digital samples to the OTDR system 15. OTDR system 15 is configured to detect anomalies, such as degraded splices, along the optical fiber 14 based on the digital samples.

Although not depicted in FIG. 1, portions of the optical transmitter 16, optical coupler 18, and/or reflection processor 20 may be implemented as an optical subassembly such as a bi-directional optical subassembly (BOSA), as is known in the art. For example, in some embodiments the BOSA may include components for directing or filtering transmitted and received optical signals from an optical signal source of the optical transmitter 16 (e.g., a laser) and to a receiver of reflection processor 20 (e.g., an avalanche photodiode). The BOSA may also include or connect to an optical coupler 18 that is used to separate transmitted signals from received signals. Thus, although optical transmitter 16 and reflection processor 20 are depicted as separate components in FIG. 1, portions of each of these components may be implemented in a single BOSA. Reflections from portions of the optical transmitter 16 that are implemented within the BOSA may be received by the reflection processor 20. Notably, reflections from the BOSA are not attenuated by the fiber 14 and are usually at a higher power than the reflections received from the fiber 14, particularly relative to reflections from points on the fiber 14 far from the transmitter 16.

Figure 2:
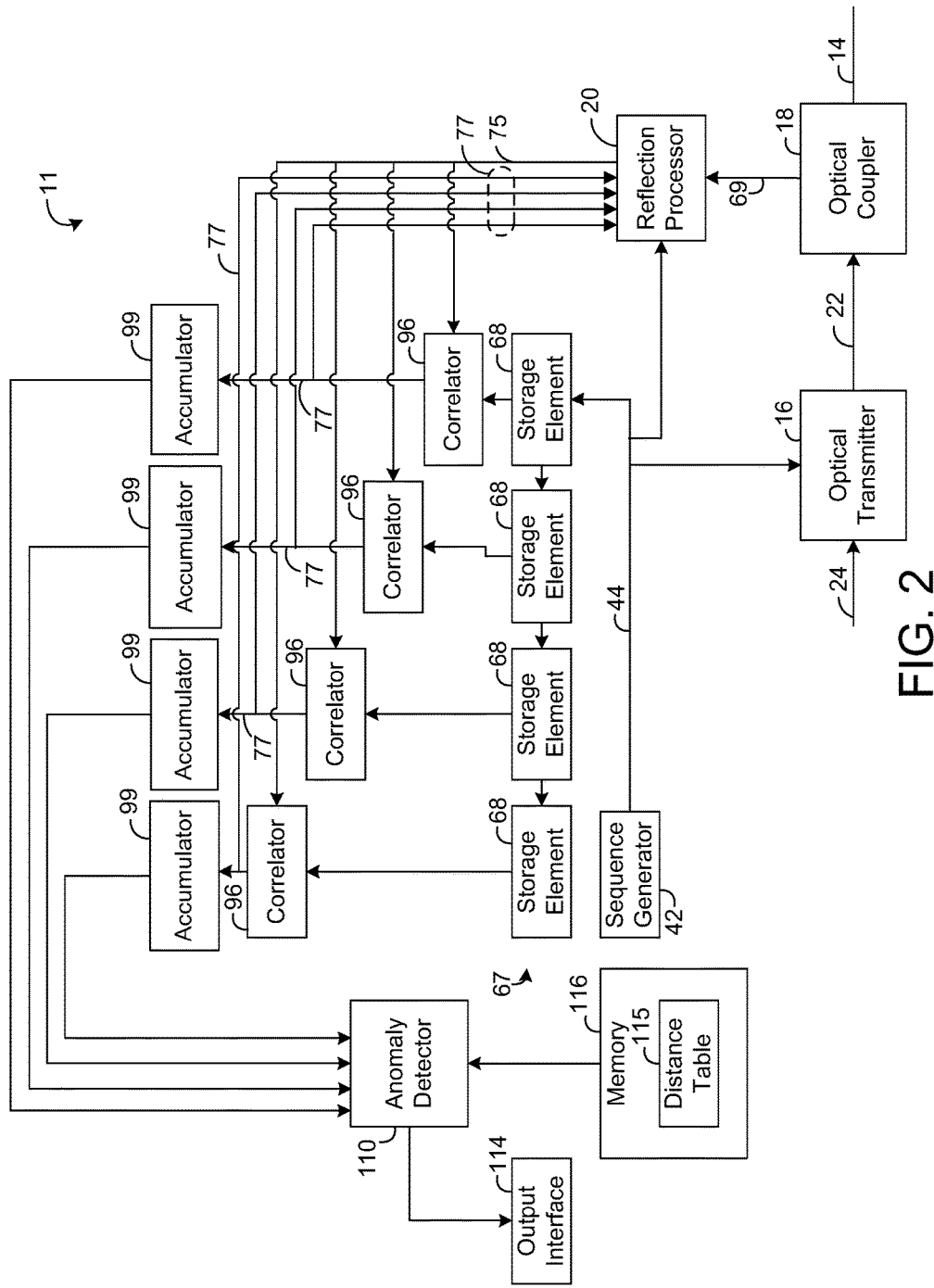
FIG. 2 is a block diagram illustrating an exemplary embodiment of an optical transmission system, such as is depicted by FIG. 1.

FIG. 2 depicts an exemplary embodiment of an optical transmission system 11 incorporating a correlation OTDR. As shown by FIG. 2, the system 11 comprises a sequence generator 42 that generates a digital data sequence 44. In one exemplary embodiment, the data sequence 44 is a PN sequence, such as an M-sequence. As is known in the art, an M-sequence has correlation properties that generally make this type of sequence preferred for many applications, including anomaly detection. However, other types of digital data sequences, such as a random data sequence, may be used in other embodiments. For illustrative purposes, it will be assumed hereafter that the digital data sequence 44 is a PN sequence and, more specifically, an M-sequence.

The optical transmission system 11 also includes an optical transmitter 16 that is configured to transmit an optical data signal across an optical fiber 14. The optical data signal 22 may be generated from a received digital data signal 24, an OTDR signal generated based on a digital data sequence 44, or a combination thereof, for example, as is described in commonly-owned U.S. Pat. No. 8,606,117, which is incorporated by reference herein in its entirety. The optical transmitter 16 is also coupled to an optical coupler 18 (such as a directional coupler) that is coupled to the optical fiber 14, as shown by FIG. 2. The optical transmitter 16 converts the received data signal 24 and/or the digital data sequence 44 to an optical data signal 22 that is transmitted through the optical coupler 18 to the optical fiber 14, which carries the optical signal 22 to the optical receiver 12 (FIG. 1) at a remote location.

Sequence generator 42 is also coupled to a delay line 67 through which the digital data sequence 44 is serially shifted. In this regard, the delay line 67 has a plurality of storage elements 68, and each storage element 68 stores a respective value (i.e., +1 or −1) of the digital data sequence 44 as it is being shifted through the delay line 67. Further, sequence generator 42 also provides the digital data sequence 44 to reflection processor 20.

During transmission, portions of the optical signal 22 reflect back toward the optical transmission system 11 as it travels along the optical fiber 14. The amplitude of the reflected optical signal at each location is affected by normal backscattering and by line anomalies, such as degraded splices. The optical coupler 18 receives from the fiber 14 a reflected optical signal 69, comprising the reflections of the optical signal 22 as it travels along the fiber 14. The optical coupler 18 provides the reflected optical signal 69 to reflection processor 20, which generates and processes an analog reflection signal based on the reflected optical signal 69, the digital data sequence 44, and correlation values 77. As described hereafter, a digital filter of reflection processor 20 utilizes the digital data sequence 44 and correlation values 77 to generate a cancellation signal, the cancellation signal removing an undesired portion of the analog reflection signal generated from reflected optical signal 69. The reflection processor 20 then outputs digital samples 75 defining a sequence of digital values that are provided to correlators 96. In one exemplary embodiment, the digital samples 75 are serially transmitted at the same frequency as the digital data sequence 44.

Each correlator 96 corresponds to a respective location along the optical path, which includes points along the fiber 14 and before the fiber (e.g., between the transmitter 16 and the fiber 14 including points within a BOSA when a BOSA is used to implement the transmitter 16). In this regard, for a given correlator 96, there is a finite delay from the time that a value of the digital data sequence 44 is transmitted by the optical transmitter 16 until the value is shifted into the storage element 68 that is coupled to the correlator 96. Further, each point along the optical path—including optical transmitter 16, optical coupler 18, and optical fiber 14—has a reflection delay that is based on the point's distance from the optical transmitter 16. As used herein, a point's "reflection delay" is the amount of time for a sample to travel from the optical transmitter 16 to the point, return to the detector, and reach the correlator 96. Generally, the further the point is from the optical transmitter 16, the greater is the point's reflection delay. Moreover, the location corresponding to the correlator 96 is that location where the reflection delay is equal to the correlator's sequence delay. Thus, if a particular PN sequence value ($V_1$) transmitted by the optical transmitter 16 is reflected at the point along the optical path corresponding to a given correlator 96, then the transmitted value ($V_1$) should have been delayed by the delay line 67 such that it is in the storage element 68 coupled to the correlator 96 when the reflection of the value ($V_1$) is received from by such correlator 96. Note that, for each correlator 96, the accumulator 99 that accumulates correlation values from the correlator 96 and the storage element 68 that provides PN sequence values to the correlator 96 also correspond to the same location along the optical path as the correlator 96. Moreover, the storage element 68 corresponding to a particular location is that storage element 68 that is storing a value ($V_1$) when the reflection of such value is received by the correlator 96 that correlates such value.

The correlators 96 are respectively coupled to the storage elements 68 of the delay line 67, as shown by FIG. 2. Each correlator 96 correlates (e.g., multiplies and accumulates) successive digital samples 75 with values stored in a respective one of the storage elements 68. The digital data sequence 44 is serially shifted through the storage elements 68 of the delay line 67. As shown by FIG. 2, the output of each correlator 96 is a correlation value 77 that is coupled to a respective accumulator 99 (if provided in the OTDR system), reflection processor 20, and/or anomaly detector 110. Accumulators 99, anomaly detector 110, memory 116 (including distance table 115), and output interface 114 may function in a manner as described in commonly-owned U.S. Pat. No. 8,606,117, which is incorporated by reference herein in its entirety.

Note that, in one exemplary embodiment, the components of the OTDR system 15 are implemented in hardware, such as a field programmable gate array (FPGA). However, in other embodiments, it is possible for various components to be implemented in hardware, software, firmware, or combinations thereof.

Figure 3:
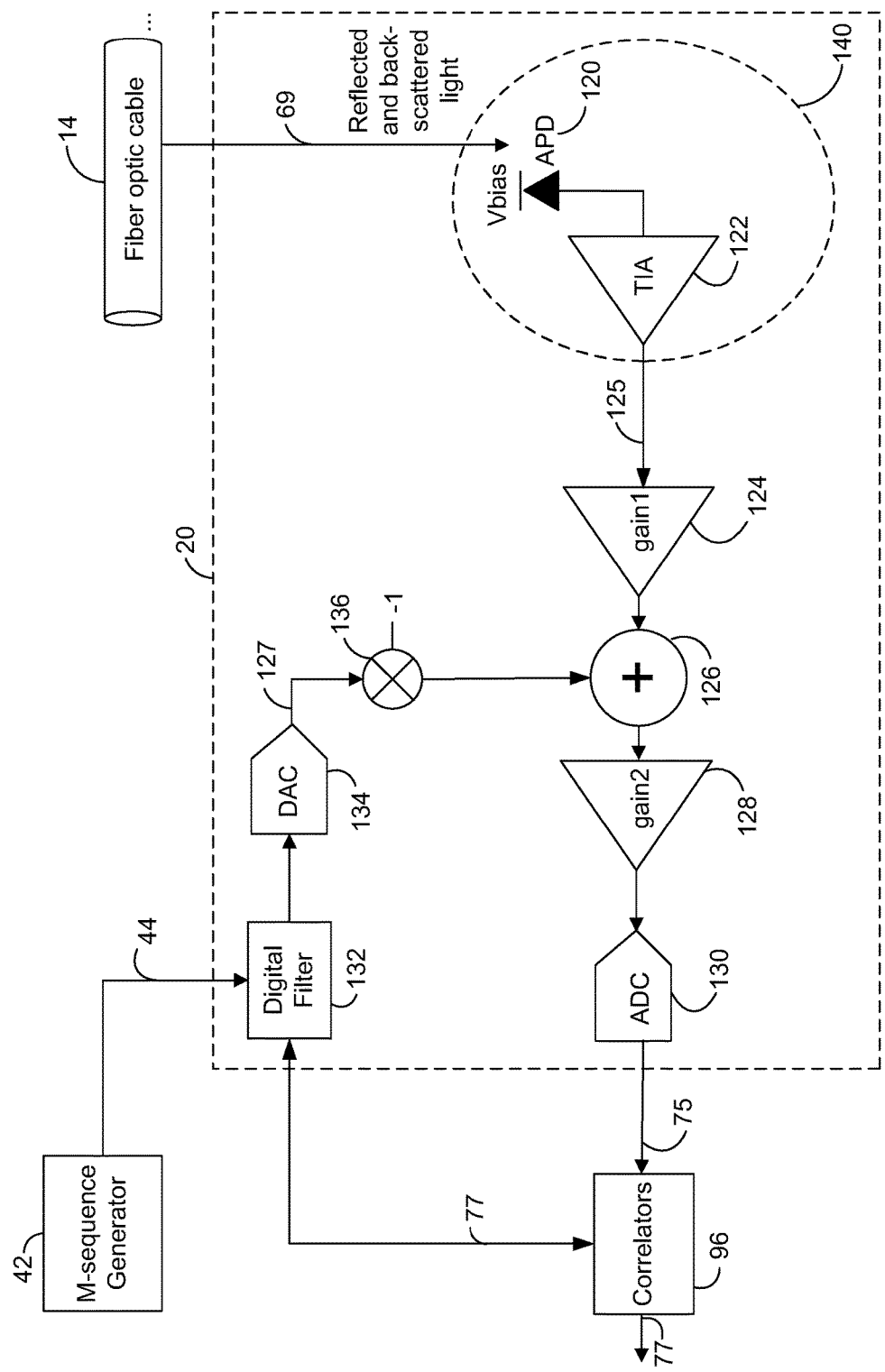
FIG. 3 is a block diagram illustrating an exemplary embodiment of a reflection processor that cancels an undesired portion of an analog reflection signal.

FIG. 3 depicts one exemplary embodiment of the reflection processor 20. As was depicted in FIG. 2, a reflection processor 20 has inputs including a reflected optical signal 69, a digital data sequence 44, and correlation values 77 from correlators 96. Reflection processor 20 outputs digital samples 75.

A reflected optical 69 signal from optical fiber 14 is received by photo detector 120, such as an avalanche photo diode (APD). Although not depicted in FIG. 3, this reflected optical signal may be provided to photo detector 120 via optical coupler 18. Together with transimpedance amplifier 122, the photo detector 120 forms an optical detector 140 for converting an optical signal into an electrical signal. As is known in the art, transimpedance amplifier 122 provides an analog output based on the reflected optical signal 69 received at photo detector 120, resulting in an analog reflection signal 125 that is output from optical detector 140. In other embodiments, other types of optical detectors may be used.

Reflection processor 20 also includes an analog-to-digital conversion path. Although it will be understood that an analog-to-digital conversion path may include any suitable components, in an embodiment it includes first gain element 124, a subtraction element (e.g., adder 126 and multiplier 136), second gain element 128, and analog-to-digital converter 130.

In some embodiments, a gain is applied to analog reflection signal 125 by first gain element 124. As described in FIG. 6 hereafter, the gain of first gain element 124 is optimized such that analog reflection signal 125 is scaled to closely match a cancellation signal 127. The gain-enhanced analog reflection signal 125 is provided to an adder 126 from gain element 124, to have a cancellation signal 127 subtracted therefrom as described herein. The output of adder 126 is an analog signal that has had an undesired portion minimized based on the subtraction of the cancellation signal 127. This analog signal with the undesired portion minimized is provided to second gain element 128. Second gain element 128 has a gain that is optimized to allow the desired portion of the analog reflection signal 125 to encompass a large percentage of the dynamic range of analog-to-digital converter 130. This gain may be fixed or variable.

Analog-to-digital converter 130 converts the gain-enhanced desired portion of the analog reflection signal 125 into digital samples 75. Because the undesired portion of the analog reflection signal 125 has been minimized as a result of the subtraction by the cancellation signal 125, more of the dynamic range of the analog-to-digital converter 130 is available to process the desired portion of the analog reflection signal 125. The undesired portion of the analog reflection signal 125 corresponds to large reflections such as those that occur in the optical transmitter 16 or the optical coupler 18. Without removal of these undesired portions of the analog reflection signal 125, these nearby reflections can consume a significant portion of the available dynamic range of the analog-to-digital converter 130.

The output of the analog-to-digital converter 130 of reflection processor 20 is digital samples 75 that are provided to each of the correlators 96. Correlators 96 process digital samples 75 based on delayed versions of the delayed digital data sequence 44, as described herein. Each correlator 96 is associated with a location along the optical path that includes optical transmitter 16, optical coupler 18, and optical fiber 14. A first subset of correlation values 77 from correlators 96 are provided to digital filter 132 of reflection processor 20. In one embodiment, this first subset includes correlation values 77 from correlators 96 that are associated with locations that result in undesired reflections, such as the correlators 96 associated with the optical transmitter 16 and optical coupler 18. Specifically, when a BOSA is used to implement the optical transmitter 16, the first subset of correlation values includes values from correlators 96 that are associated with locations within the BOSA (e.g., locations in the optical path between the optical transmitter 16 and the optical coupler 18).

Digital filter 132 of reflection processor 20 also receives digital data sequence 44 from sequence generator 42. In one embodiment, digital filter 132 is a finite impulse response (FIR) filter having a plurality of taps, each tap associated with a delayed version of the digital data sequence 44. As described hereafter in FIG. 4, digital filter 132 adjusts the relative contribution of the taps in order to minimize (e.g., reduce below a threshold) the received correlation values 77, thus also minimizing the undesired portion of the analog reflection signal 125. Digital filter 132 then continues to monitor the correlation values 77 that are associated with the locations that cause the undesired portions of the analog reflection signal 125 and to adjust the relative weighting of each of the taps.

The output of digital filter 132 is a digital cancellation signal that is provided to digital-to-analog converter 134. Digital-to-analog converter 134 generates an analog version of the cancellation signal 127 that is provided to multiplier 136. Multiplier 136 multiplies the analog version of the cancellation signal 127 by −1, resulting in the cancellation signal 127 being subtracted from the gain-enhanced analog reflection signal 125 at adder 126. Thus, the multiplier 136 and adder 126 collectively function as a subtraction element that subtracts the cancellation signal 127 from the gain-enhanced analog reflection signal 125.

Although digital filter 132 of reflection processor 20 has been described herein as an FIR filter, it will be understood that any suitable filter may be used to generate the cancellation signal 127. In one embodiment, a least mean squares (LMS) algorithm may be used by the digital filter.

Figure 4:
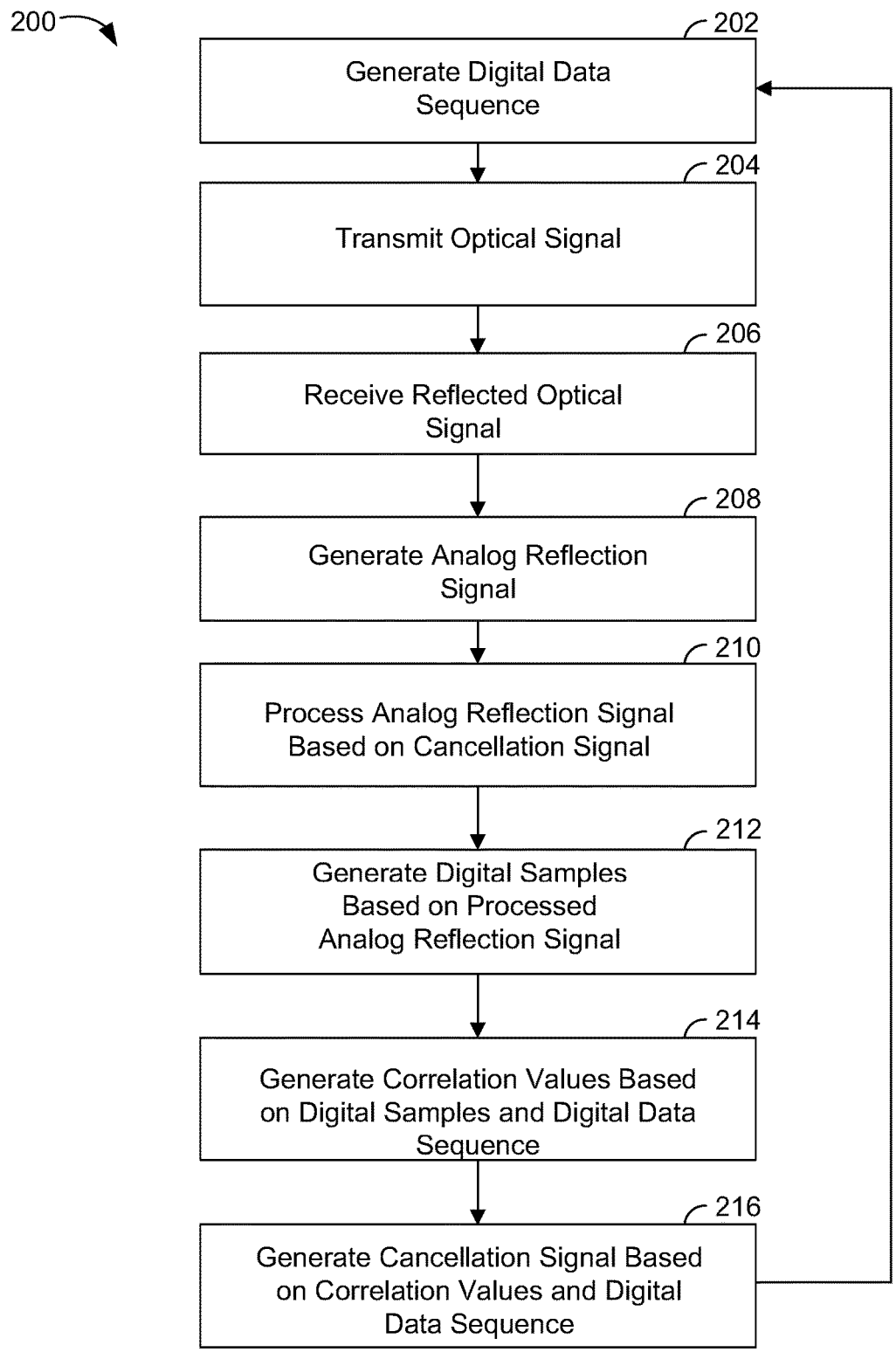
FIG. 4 is a flow chart illustrating an exemplary method of removing an undesired portion of an analog reflection signal.
Figure 5:
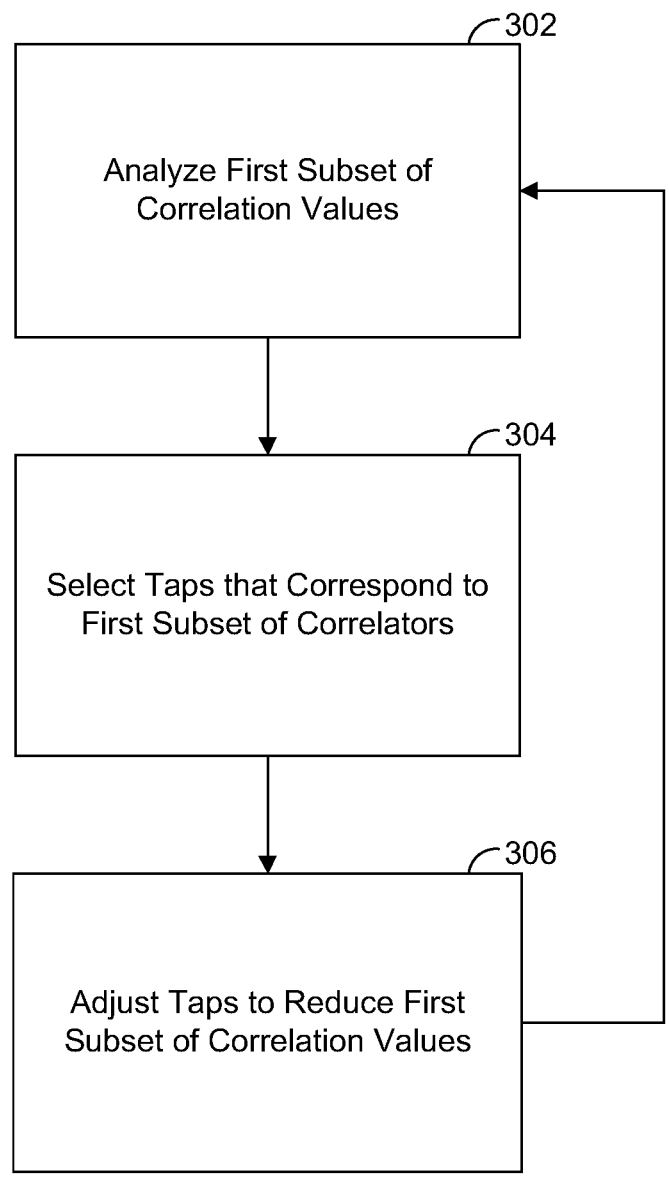
FIG. 5 is a flow chart illustrating an exemplary method of adjusting a digital filter for minimizing an undesired portion of an analog reflection signal.
Figure 6:
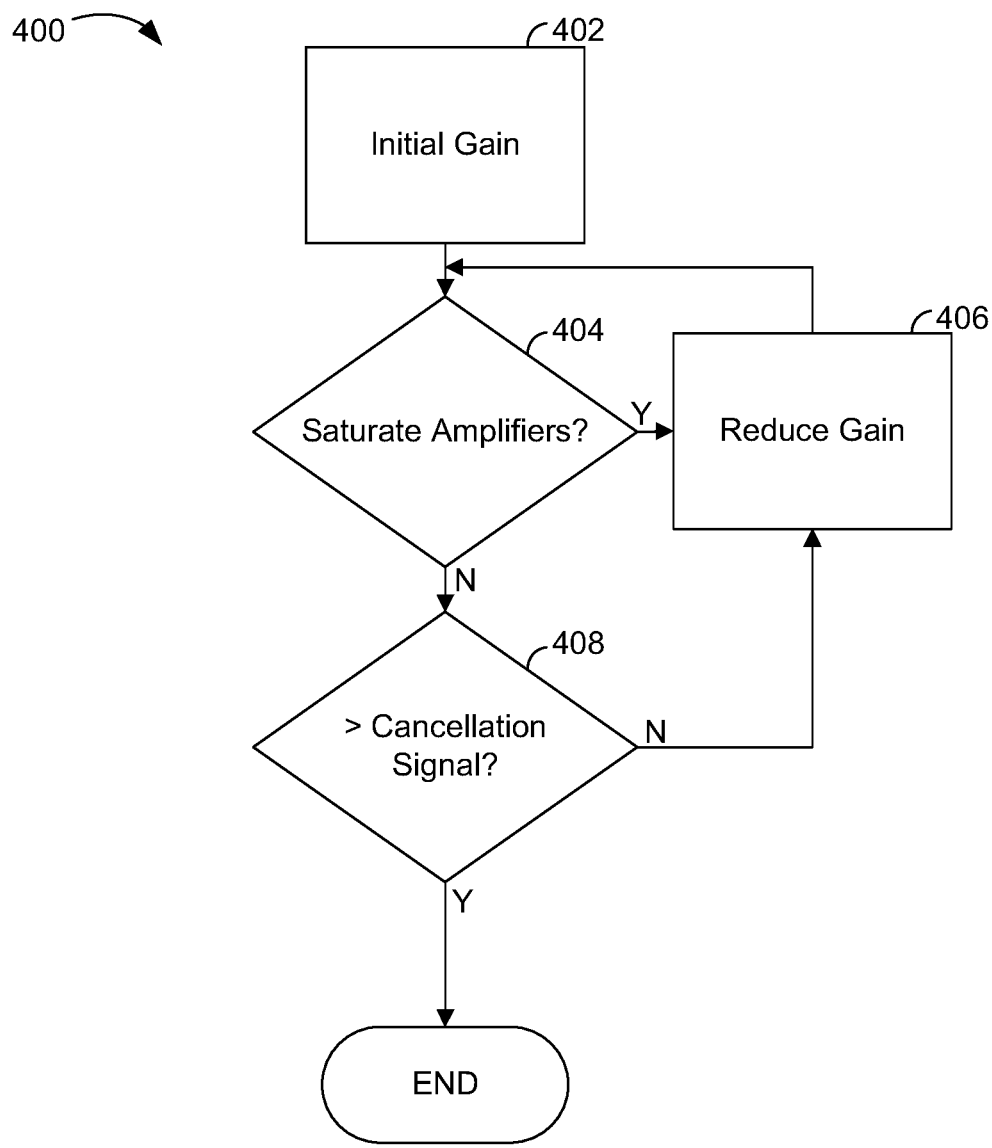
FIG. 6 is a flow chart illustrating an exemplary method for setting a first gain value of a reflection processor.

FIGS. 4-6 depict method steps in accordance with embodiments of the present disclosure. Although particular steps are depicted in FIGS. 4-6, it will be understood that additional steps may be included within the depicted steps, steps may be removed from the depicted steps, steps may be changed, and any of the steps may be modified. Any non-sequential, or branched, flow illustrated via a flow chart should be understood to indicate that various other branches, flow paths, and orders of the steps, can be implemented which achieve the same or similar result.

FIG. 4 is a flow chart illustrating steps 200 of an exemplary method of removing an undesired portion of the analog reflection signal 125. At step 202, a digital data sequence 44 is generated. Although digital data sequence 44 may be generated in any suitable manner, in one embodiment the digital data sequence 44 is an M-sequence that is generated by sequence generator 42. Digital data sequence 44 is provided to various components of the optical transmission system such as optical transmitter 16, reflection processor 20, and storage elements 68. Within reflection processor 20, the digital data sequence 44 is provided to a digital filter 132.

At step 204, an optical signal 22 is generated by optical transmitter 16, based at least in part on digital data sequence 44. Optical signal 69 is transmitted over an optical path including optical transmitter 16, optical fiber 14, and optical coupler 18.

At step 206, reflections of the transmitted optical signal are received as a reflected optical signal 69. The reflected optical signal 69 includes reflections caused by the optical transmitter 16 (e.g., from within portions of the optical transmitter 16 implemented in a BOSA), optical coupler 18, and optical fiber 14.

At step 208, the reflections are received and processed by an optical detector 140 of reflection processor 20. Optical detector 140 includes a photo detector 120 and a transimpedance amplifier 122, which collectively generate an analog reflection signal 125 from the reflected optical signal 69. In addition, the analog reflection signal 125 may be processed by first gain element 124. This processing results in the analog reflection signal 125 being scaled in a manner such that the undesired portion of the analog reflection signal 125 may be minimized by the cancellation signal 127 at step 210.

At step 210, the gain-enhanced analog reflection signal 125 is processed based on a cancellation signal 127. Although processing of the analog reflection signal 125 based on the cancellation signal 127 may be performed in any suitable manner, in one embodiment, the cancellation signal 127 is subtracted from the gain-enhanced analog reflection signal 125 at a subtraction element. Although the subtraction element may be implemented in any suitable manner, in one embodiment the subtraction element includes a multiplier 136 that produces a negative version of the cancellation signal 127 and an adder 126 that adds the gain-enhanced analog reflection signal 125 to the negative-signed cancellation signal 127. The result of the processing of step 210 is a processed analog reflection signal that has minimized the undesired portion of the analog reflection signal 125.

When an initial portion of a reflected optical signal 69 is received, the digital filter 132 of the reflection processor 20 may not yet have enough information to generate an accurate cancellation signal 127, since there may not yet be any correlation value 77 feedback from the correlators 96. During this initial startup phase, the cancellation signal 127 may be zero, which may allow the entire gain-enhanced analog reflection signal 125 to pass to the correlators 96. In other embodiments, an initial cancellation signal 127 may be provided based on expected or previous cancellation signals 127 that minimize the undesired portion of a typical gain-enhanced analog reflection signal 125.

At step 212, digital samples 75 are generated based on the desired portion of the analog reflection signal 125. Minimizing the undesired portion of the analog reflection signal 125 may allow for a larger percentage of the dynamic range of the analog-to-digital converter 130 to be utilized for converting the desired portion of the analog reflection signal 125 to a digital signal. In one embodiment, a gain may be applied to the processed analog reflection signal 125 by second gain element 128 prior to processing by analog-to-digital converter 130. This gain may be fixed or adjustable.

An adjustable gain may originally have a low value to allow for processing of the initial portion of the analog reflection signal prior to the correlators 96 providing correlation value 77 feedback to the digital filter 132. Until this correlation value 77 feedback is received, it may be difficult for the digital filter 132 to generate an accurate cancellation signal 127 to minimize the undesired portion of the analog reflection signal 125. The gain may be increased once the cancellation signal 127 begins to minimize the undesired portion of the analog reflection signal 127.

After the gain of the gain element 128 is applied, the gain-enhanced desired portion of the analog reflection signal 125 is provided to analog-to-digital converter 130. Analog-to-digital converter 130 converts this signal into digital samples 75 which are provided to the correlators 96.

At step 214, the correlators 96 generate correlation values 77 based on digital samples 75 and the digital data sequence 44. A first subset of the correlation values 77 that correspond to the locations that cause the undesired portion of the reflected optical signal 69 are provided to digital filter 132.

At step 216, the cancellation signal 127 is generated based on the first subset of correlation values 77 and the digital data sequence 44. Although the cancellation signal 127 may be generated in any suitable manner, in one embodiment, the cancellation signal 127 is generated by a digital filter 132 and a digital-to-analog converter 134. Although any suitable digital filter 132 may be used, in one embodiment, digital filter 132 is an FIR filter. The taps of the FIR filter 132 may be adjusted such that the relative weighting of the digital data sequence 44 results in a cancellation signal 127 that minimizes (e.g., decreases below a threshold) the correlation values 77 corresponding to locations prior to the fiber 14, which also means that the undesired portion of the analog reflection signal 125 has been minimized. The resulting digital cancellation signal is provided to digital-to-analog converter 134, which generates the cancellation signal 127 that is subtracted from the analog reflection signal.

Processing then continues as the reflected optical signal 69 continues to be received. At steps 202 through 216, the feedback of correlation values 77 from the correlators 96 continues to produce a cancellation signal 127 at the digital filter 132, and that cancellation signal 127 is used to minimize the undesired portion of the analog reflection signal 125.

FIG. 5 is a flow chart illustrating steps 300 of an exemplary method of adjusting a digital filter 132 for removing an undesired portion of an analog reflection signal 125. Although it will be understood that steps 300 may be performed in any suitable manner, in one embodiment steps 300 may be performed by digital filter 132 which is an FIR filter.

At step 302, digital filter 132 analyzes the first subset of correlation values 77 that are output by the first subset of correlators 96. As described herein, the first subset of correlators 96 correspond to locations that are not desired for processing by the OTDR system 15, such as the optical transmitter 16 and coupler 18. Digital filter 132 analyzes the correlation values 77 from the first subset of correlators 96 to determine whether this first subset of correlation values 77 should be reduced, i.e. by adjusting the cancellation signal 127. For example, digital filter 132 may compare each of the first subset of correlation values 77 to a threshold. If a correlation value 77 exceeds the threshold, digital filter 132 determines that the cancellation signal 127 should be adjusted to reduce that correlation value 77.

At step 304, digital filter 132 adjusts taps that correspond to correlators 96 that have values 77 that need to be reduced. In one embodiment, each tap of digital filter 132 may correspond to a correlator 96. That is, the delay associated with each tap of digital filter 132 may correspond to the delay associated with a particular correlator 96. For each correlator that has a correlation value 77 that needs to be reduced, the corresponding tap may be selected to be adjusted. For example, for each correlation value 77 that exceeds the threshold, the corresponding tap associated with that correlator 96 may be selected.

At step 306, the taps of digital filter 132 are adjusted to minimize the first subset of correlation values 77 of the first subset of correlators 96, for example, until each of the first subset of correlation values is reduced below a threshold. Each tap includes a delayed version of the digital data sequence 44, and adjustment of the tap results in a relative weighting of that tap's contribution to the overall cancellation signal 127. The resulting digital cancellation signal includes the combined contributions of the relative weighting of all of the taps of digital filter 132. This digital cancellation signal is then provided to digital-to-analog converter 134 such that an analog version of the cancellation signal 127 can be subtracted from the analog reflection signal 125. Processing then returns to step 302 as digital filter 132 continues to monitor the first subset of correlation values 77 and adjust the cancellation signal 127 based on that monitoring.

FIG. 6 is a flow chart illustrating steps 400 of an exemplary method for setting a first gain value of a reflection processor 20. The first gain value is a value for gain element 124, which includes any suitable circuitry for applying a gain to an analog signal (e.g. amplifiers).

At step 402, an initial gain value is selected. This initial gain value should be selected at a low value such that the worst expected reflection (e.g., from an undesired portion of the reflected signal) will not exceed allowed signal levels. This initial value may be an estimate that may be adjusted in steps 404 through 408.

At step 404, it is determined whether the amplifiers (e.g., of gain element 124) are saturated. If the amplifiers are determined to be saturated, processing continues to step 406, where the gain is reduced. If the amplifiers are determined not to be saturated, processing continues to step 408.

At step 408, it is determined whether the signal output from first gain element 124 is suitably matched to the signal that is output from the digital-to-analog converter 134. If the resulting analog reflection signal 125 output by first gain element 124 is too large to be cancelled by the cancellation signal 127, processing continues to step 406 where the gain is reduced. If the gain is reduced at step 406 in response to either of steps 404 or 408, processing continues to step 404 to continue the checking steps. If both steps 404 and 408 are satisfied, processing continues to step 410.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

Now, therefore, the following is claimed:

1. An optical system, comprising:
   a sequence generator configured to generate a digital data sequence;
   an optical transmitter coupled to an optical fiber of an optical path, the optical transmitter configured to convert a signal including the digital data sequence to an optical signal and to transmit the optical signal across the optical path;
   an optical detector configured to receive a reflected optical signal and output an analog reflection signal based on the reflected optical signal;
   an analog-to-digital conversion path configured to output digital samples based on the analog reflection signal and a cancellation signal;
   a plurality of correlators configured to correlate the digital samples with delayed versions of the digital data sequence, wherein a correlation value is provided by each correlator, and wherein each correlator is associated with a location along the optical path; and
   a filter configured to provide the cancellation signal based on the digital data sequence and a first subset of the correlation values from the correlators.

2. The optical system of claim 1, wherein the filter is configured to generate the cancellation signal such that the first subset of correlation values are minimized.

3. The optical system of claim 2, wherein the analog-to-digital conversion path comprises:
   a first gain element configured to apply a first gain value to the analog reflection signal to generate a gain-enhanced analog reflection signal;
   a subtraction element configured to subtract the cancellation signal from the gain-enhanced analog reflection signal;
   an analog-to-digital converter configured to output the digital samples based on the subtracted signal.

4. The optical system of claim 3, wherein the first gain value is adjustable based on a saturation level of the first gain element and an input referred noise level of one or more components of the optical system.

5. The optical system of claim 3, further comprising a second gain element configured to apply a second gain value to the subtracted signal and provide the gain-enhanced subtracted signal to the analog-to-digital converter.

6. The optical system of claim 5, wherein the second gain value is adjustable based on a saturation level of the analog-to-digital converter and an input referred noise level of the analog-to-digital converter.

7. The optical system of claim 2, wherein the first subset of correlation values are associated with one or more locations of the optical transmitter and an optical coupler within the optical path.

8. The optical system of claim 7, wherein a second subset of correlation values are associated with locations of the optical fiber within the optical path.

9. The optical system of claim 8, further comprising an anomaly detector configured to identify an anomaly along the optical fiber based on the second subset of correlation values.

10. An optical system, comprising:
    a sequence generator configured to generate a digital data sequence;
    an optical transmitter coupled to an optical fiber of an optical path, the optical transmitter configured to convert a signal including the digital data sequence to an optical signal and to transmit the optical signal across the optical path;
    an optical detector configured to receive a reflected optical signal and output an analog reflection signal based on the reflected optical signal;
    a subtraction element configured to subtract a cancellation signal from the analog reflection signal;
    an analog-to-digital converter configured to output digital samples based on the subtracted signal;
    a plurality of correlators configured to correlate the digital samples with delayed versions of the digital data sequence, wherein a correlation value is provided by each correlator, and wherein each correlator is associated with a location along the optical path; and
    a filter configured to provide the cancellation signal based on the digital data sequence and a first subset of the correlation values.

11. The optical system of claim 10, wherein the filter is configured to generate the cancellation signal such that the first subset of correlation values are minimized.

12. The optical system of claim 11, further comprising a gain element configured to apply a gain value to the subtracted signal and thereby provide a gain-enhanced subtracted signal to the analog-to-digital converter, wherein the gain value is adjustable based on a saturation level of the analog-to-digital converter and an input referred noise level of the analog-to-digital converter.

13. An optical system, comprising:
    a sequence generator configured to generate a digital data sequence;
    an optical transmitter coupled to an optical fiber of an optical path, the optical transmitter configured to convert a signal including the digital data sequence to an optical signal and to transmit the optical signal across the optical path;
    an optical detector configured to receive a reflected optical signal and output an analog reflection signal based on the reflected optical signal;
    an analog-to-digital conversion path configured to output digital samples based on the analog reflection signal and a cancellation signal;
    a plurality of correlators configured to correlate the digital samples with delayed versions of the digital data sequence, wherein a correlation value is provided by each correlator, and wherein each correlator is associated with a location along the optical path;
    a filter configured to provide a digital cancellation signal based on the digital data sequence and a first subset of the correlation values, wherein the filter is configured to generate the cancellation signal such that the first subset of correlation values are minimized; and a digital-to-analog converter configured to receive the digital cancellation signal and provide the cancellation signal as an output.

14. The optical system of claim 13, wherein the analog-to-digital conversion path comprises a gain element configured to apply a gain value to the analog reflection signal to generate a gain-enhanced analog reflection signal and a subtraction element to subtract the cancellation signal from the gain-enhanced analog reflection signal, wherein the gain value is adjustable based on an input referred noise level of the digital-to-analog converter.

15. A method for operating an optical time-domain reflectometer, comprising:
    generating a digital data sequence;
    converting the digital data sequence into an optical signal;
    transmitting the optical signal across an optical path;
    receiving a reflected optical signal from the optical path;
    converting the reflected optical signal into an analog reflection signal having a desired portion and an undesired portion;
    combining a cancellation signal with the analog reflection signal thereby reducing the undesired portion of the analog reflection signal;
    providing digital samples based on the desired portion of the analog reflection signal;
    delaying the digital data sequence;
    correlating, at a plurality of correlators, the digital samples with delayed versions of the digital data sequence, thereby providing a plurality of correlation values; and
    filtering a first subset of the correlation values, thereby providing the cancellation signal.

16. The method of claim 15, wherein the filtering provides the cancellation signal such that the first subset of correlation values are minimized.

17. The method of claim 16, further comprising applying a first gain value to the analog reflection signal, thereby providing a gain-enhanced analog reflection signal, and wherein the combining comprises subtracting the cancellation signal from the gain-enhanced analog reflection signal.

18. The method of claim 17, wherein the first gain value is adjustable based on a saturation level of a first gain element associated with the first gain value and an input referred noise level of one or more components of the optical time-domain reflectometer.

19. The method of claim 17, wherein the providing the digital samples comprises:
    applying a second gain value to the desired portion of the analog reflection signal, thereby providing a gain-enhanced desired portion of the analog reflection signal; and
    converting, at an analog-to-digital converter, the gain-enhanced desired portion of the analog reflection signal into the digital samples.

20. The method of claim 19, wherein the second gain value is adjustable based on a saturation level of the analog-to-digital converter and an input referred noise level of the analog-to-digital converter.

21. The method of claim 16, wherein the first subset of correlation values are associated with locations of one or more of an optical transmitter and an optical coupler within the optical path.

22. The method of claim 21, wherein a second subset of correlation values are associated with locations along an optical fiber within the optical path.

23. The method of claim 22, further comprising detecting an anomaly based on the second subset of correlation values.

* * * * *